(12) United States Patent
Schwarz et al.

(10) Patent No.: US 10,794,208 B2
(45) Date of Patent: Oct. 6, 2020

(54) NON-CONTACT SEAL ASSEMBLY FOR ROTATIONAL EQUIPMENT WITH LINKAGE BETWEEN ADJACENT ROTORS

(71) Applicant: United Technologies Corporation, Hartford, CT (US)

(72) Inventors: Frederick M. Schwarz, Glastonbury, CT (US); William K. Ackermann, East Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 651 days.

(21) Appl. No.: 14/794,516

(22) Filed: Jul. 8, 2015

(65) Prior Publication Data

US 2017/0009596 A1 Jan. 12, 2017

(51) Int. Cl.
| | | |
|---|---|---|
| *F01D 11/08* | (2006.01) | |
| *F01D 11/04* | (2006.01) | |
| *F01D 11/00* | (2006.01) | |
| *F16J 15/44* | (2006.01) | |
| *F16J 15/3284* | (2016.01) | |
| *B64D 27/10* | (2006.01) | |

(Continued)

(52) U.S. Cl.
CPC .............. *F01D 11/08* (2013.01); *B64D 27/10* (2013.01); *F01D 11/001* (2013.01); *F01D 11/04* (2013.01); *F04D 29/324* (2013.01); *F04D 29/545* (2013.01); *F16J 15/3284* (2013.01); *F16J 15/44* (2013.01); *F16J 15/442* (2013.01); *F05D 2220/32* (2013.01); *F05D 2240/55* (2013.01)

(58) Field of Classification Search
CPC ...... F01D 11/00; F01D 11/001; F01D 11/003; F01D 11/005; F01D 11/02; F01D 11/025; F16J 15/44; F16J 15/441; F16J 15/442
See application file for complete search history.

(56) References Cited

U.S. PATENT DOCUMENTS 2,681,788 A * 6/1954 Wosika ................... F01D 9/044
 415/136
3,849,023 A * 11/1974 Klompas ................ F01D 9/042
 415/173.7

(Continued)

FOREIGN PATENT DOCUMENTS

| EP | 1269048 | 1/2003 |
|---|---|---|
| EP | 1654484 | 5/2005 |

(Continued)

OTHER PUBLICATIONS

EP search report for EP16178693.4 dated Dec. 2, 2016.

*Primary Examiner* — Brian P Wolcott
*Assistant Examiner* — Elton K Wong
(74) *Attorney, Agent, or Firm* — Getz Balich LLC (57) ABSTRACT

An assembly is provided for rotational equipment such as a gas turbine engine for an aircraft propulsion system. This assembly includes a stator, a rotor and a seal assembly. The rotor extends axially along a centerline. The rotor includes a linkage, a first rotor disk, and a second rotor disk. The linkage extends axially from the first rotor disk to the second rotor disk. The linkage is removably attached to the second rotor disk. The seal assembly is configured for sealing a gap radially between the stator and the linkage. The seal assembly includes a hydrostatic non-contact seal.

17 Claims, 12 Drawing Sheets

(51) Int. Cl.
*F04D 29/32* (2006.01)
*F04D 29/54* (2006.01)

(56) References Cited

U.S. PATENT DOCUMENTS

| | | | |
|---|---|---|---|
| 4,998,739 A * | 3/1991 | Weiler | F16J 15/441 |
| | | | 277/422 |
| 6,428,009 B2 | 8/2002 | Justak | |
| 7,182,345 B2 | 2/2007 | Justak | |
| 7,410,173 B2 | 8/2008 | Justak | |
| 7,797,941 B2 | 9/2010 | Munsell | |
| 7,896,352 B2 | 3/2011 | Justak | |
| 7,927,069 B2 | 4/2011 | Erickson et al. | |
| 8,002,285 B2 | 8/2011 | Justak | |
| 8,105,021 B2 | 1/2012 | Glahn | |
| 8,109,716 B2 | 2/2012 | Glahn | |
| 8,109,717 B2 | 2/2012 | Glahn | |
| 8,167,545 B2 | 5/2012 | Glahn | |
| 8,172,232 B2 | 5/2012 | Justak | |
| 2002/0000694 A1 | 1/2002 | Justak | |
| 2003/0102629 A1* | 6/2003 | Bhate | F01D 11/003 |
| | | | 277/355 |
| 2004/0150164 A1* | 8/2004 | Morgan | F01D 11/001 |
| | | | 277/345 |
| 2004/0217549 A1 | 11/2004 | Justak | |
| 2007/0018409 A1 | 1/2007 | Justak | |
| 2007/0096397 A1 | 5/2007 | Justak | |
| 2007/0120327 A1 | 5/2007 | Justak | |
| 2008/0048398 A1* | 2/2008 | Baird | F01D 11/003 |
| | | | 277/355 |
| 2008/0100000 A1 | 5/2008 | Justak | |
| 2008/0246223 A1 | 10/2008 | Justak | |
| 2008/0265513 A1* | 10/2008 | Justak | F01D 11/025 |
| | | | 277/301 |
| 2011/0121519 A1 | 5/2011 | Justak | |
| 2013/0106061 A1* | 5/2013 | Ruggiero | F01D 11/02 |
| | | | 277/411 |
| 2014/0321993 A1* | 10/2014 | Lusted | F01D 11/122 |
| | | | 415/173.3 |
| 2016/0069269 A1 | 3/2016 | Hyland et al. | |

FOREIGN PATENT DOCUMENTS

| | | |
|---|---|---|
| EP | 1269048 | 1/2006 |
| EP | 2137383 | 12/2009 |
| EP | 2279364 | 2/2011 |
| EP | 2286119 | 2/2011 |
| EP | 1654484 | 4/2011 |
| FR | 2926612 | 7/2009 |
| WO | 2001075339 | 10/2001 |
| WO | 2001075339 | 7/2002 |
| WO | 2005001316 | 1/2005 |
| WO | 2008094761 | 8/2008 |
| WO | 2009138787 | 12/2009 |
| WO | 2009146258 | 12/2009 |

* cited by examiner

NON-CONTACT SEAL ASSEMBLY FOR ROTATIONAL EQUIPMENT WITH LINKAGE BETWEEN ADJACENT ROTORS

BACKGROUND OF THE INVENTION

1. Technical Field

This disclosure relates generally to rotational equipment and, more particularly, to a non-contact seal assembly for rotational equipment.

2. Background Information

Rotational equipment typically includes one or more seal assemblies for sealing gaps between rotors and stators. A typical seal assembly includes a contact seal with a seal element such as a knife edge seal that engages a seal land. Such a contact seal, however, can generate a significant quantity of heat which can reduce efficiency of the rotational equipment as well as subject other components of the rotational equipment to high temperatures. To accommodate the high temperatures, other components of the rotational equipment may be constructed from specialty high temperature materials, which can significantly increase the manufacturing and servicing costs of the rotational equipment. While non-contact seals have been developed in an effort to reduce heat within rotational equipment, such non-contact seals can be difficult to configure within the rotational equipment. Such non-contact seals and associated components (e.g., shafts, linkages, etc.) may also need to be replaced when incidental contact occurs.

There is a need in the art for improved seal assemblies for rotational equipment.

SUMMARY OF THE DISCLOSURE

According to an aspect of the present disclosure, an assembly is provided for rotational equipment. This assembly includes a stator, a rotor and a seal assembly. The rotor extends axially along a centerline. The rotor includes linkage, a first rotor disk, and a second rotor disk. The linkage extends axially from the first rotor disk to the second rotor disk. The linkage is removably attached to the second rotor disk. The seal assembly is configured for sealing a gap radially between the stator and the linkage. The seal assembly includes a hydrostatic non-contact seal.

According to another aspect of the present disclosure, an assembly is provided for a gas turbine engine. This turbine engine assembly includes a first rotor disk, a second rotor disk and an annular linkage extending axially from the first rotor disk to the second rotor disk. This linkage is mechanically fastened to the second rotor disk. The linkage has a cylindrical surface. The turbine engine assembly also includes an annular fairing axially between the first rotor disk and the second rotor disk, and a non-contact seal configured in a gap formed between the fairing and the linkage. The non-contact seal includes a base, a plurality of shoes and a plurality of spring elements. The base is mounted to the fairing. The shoes are circumferentially arranged around and radially adjacent the cylindrical surface. Each of the spring elements are radially between and connect a respective one of the shoes to the base.

According to still another aspect of the present disclosure, an aircraft propulsion system is provided that includes a gas turbine engine which includes a compressor section. This compressor section includes a stator, a rotor and a seal assembly. The stator is configured with a monolithic full hoop body. The rotor extends axially along a centerline. The rotor includes a linkage, a first rotor disk, and a second rotor disk. The linkage extends axially from the first rotor disk to the second rotor disk. The linkage is removably attached to the second rotor disk. The seal assembly is configured for sealing a gap radially between the stator and the linkage. The seal assembly includes a hydrostatic non-contact seal. The non-contact seal is positioned directly radially above and is axially aligned with a cylindrical surface of the linkage.

The non-contact seal may include an annular base and a plurality of shoes arranged around and radially adjacent the linkage. The non-contact seal may also include a plurality of spring elements. Each of the spring elements may be radially between and may connect a respective one of the shoes to the base.

The base may be configured with a monolithic full hoop body.

A carrier may be included that connects the non-contact seal to the stator. The carrier may be configured with a monolithic full hoop body.

The non-contact seal may be positioned directly radially above and may be axially aligned with a cylindrical surface of a seal portion of the linkage.

The seal portion of the linkage may be radially thicker than adjacent portions of the linkage.

The seal portion of the linkage may have a hardface which forms the cylindrical surface.

The stator may be configured with a monolithic full hoop body.

The stator may be configured as or include a fairing configured to form an axial portion of an inner peripheral boundary of a core gas path through the rotational equipment. The rotational equipment may be configured as a gas turbine engine.

A plurality of first rotor blades may be included and arranged around and connected to the first rotor disk. A plurality of second rotor blades may be included and arranged around and connected to the second rotor disk. A plurality of stator vanes may be included and arranged around and connected to the stator. The stator vanes may be axially between the first rotor blades and the second rotor blades.

The linkage may include a flange connector attached to the second rotor disk with one or more fasteners. The flange connector may have an outermost radius. The non-contact seal may have an innermost radius that is greater than the outermost radius.

The linkage may have an outermost radius and the non-contact seal has an innermost radius that is greater than the outermost radius.

A portion of the linkage may be configured to pass through the non-contact seal during assembly.

The linkage may be configured to partially pass axially through the non-contact seal during assembly.

A carrier may be included which mounts the base to the fairing. The carrier may be configured with a monolithic full hoop body.

The fairing may be configured with a monolithic full hoop body. The base may be configured with a monolithic full hoop body.

A portion of the linkage which forms the cylindrical surface may be radially thicker than axially adjacent portions of the linkage.

The portion of the linkage may have a hardface which forms the cylindrical surface.

The seal portion of the linkage may be radially thicker by an additional thickness than adjacent portions of the linkage. A hardface may provide a portion of the additional thickness and may form the cylindrical surface.

The foregoing features and the operation of the invention will become more apparent in light of the following description and the accompanying drawings.

DETAILED DESCRIPTION OF THE INVENTION

Figure 1:
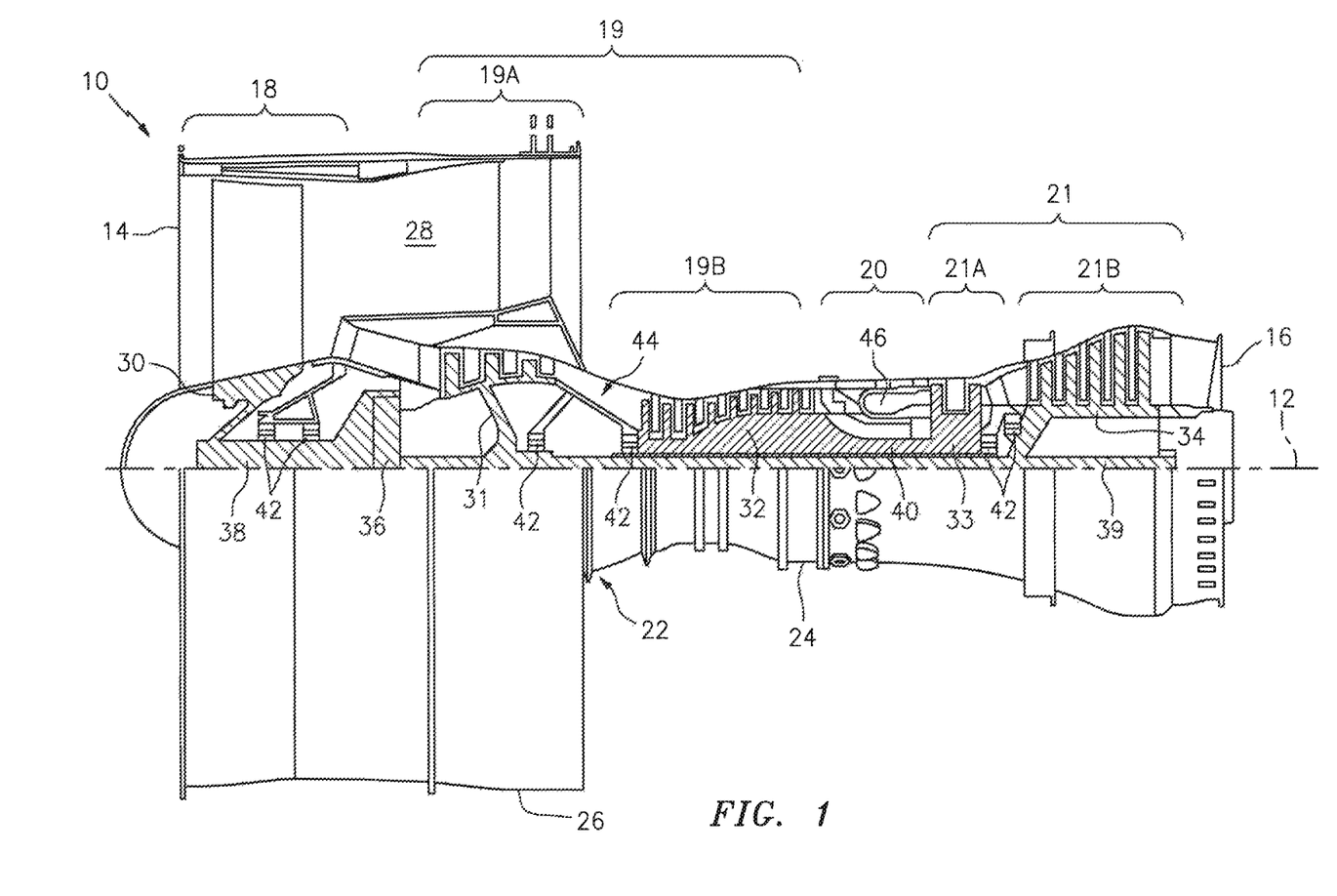
FIG. 1 is a side cutaway illustration of a gas turbine engine.

FIG. 1 is a side cutaway illustration of a gas turbine engine 10 for an aircraft propulsion system. This turbine engine 10 is configured as a geared turbofan engine, and extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. This housing 22 includes an inner case 24 (e.g., a core case) and an outer case 26 (e.g., a fan case). The inner case 24 may house one or more of the engine sections 19-21 (e.g., an engine core), and may be housed within an inner nacelle/inner fixed structure (not shown) which provides an aerodynamic cover for the inner case 24. The inner case 24 may be configured with one or more axial and/or circumferential inner sub-casings; e.g., case segments. The outer case 26 may house at least the fan section 18, and may be housed within an outer nacelle (not shown) which provides an aerodynamic cover for the outer case 26. Briefly, the outer nacelle along with the outer case 26 overlaps the inner nacelle thereby defining a bypass gas path 28 radially between the nacelles. The outer case 26 may be configured with one or more axial and/or circumferential outer case segments.

Each of the engine sections 18-19B, 21A and 21B includes a respective rotor 30-34. Each of these rotors 30-34 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s). Each of the rotors 31-34 may also include one or more rotor disk linkages, which interconnect adjacent rotor disks within the respective rotor.

The fan rotor 30 is connected to a gear train 36, for example, through a fan shaft 38. The gear train 36 and the LPC rotor 31 are connected to and driven by the LPT rotor 34 through a low speed shaft 39. The HPC rotor 32 is connected to and driven by the HPT rotor 33 through a high speed shaft 40. The shafts 38-40 are rotatably supported by a plurality of bearings 42; e.g., rolling element and/or thrust bearings. Each of these bearings 42 is connected to the engine housing 22 (e.g., the inner case 24) by at least one stationary structure such as, for example, an annular support strut.

During operation, air enters the turbine engine 10 through the airflow inlet 14. This air is directed through the fan section 18 and into a core gas path 44 and the bypass gas path 28. The core gas path 44 extends sequentially through the engine sections 19-21. The air within the core gas path 44 may be referred to as "core air". The air within the bypass gas path 28 may be referred to as "bypass air".

The core air is compressed by the compressor rotors 31 and 32 and directed into a combustion chamber 46 of a combustor in the combustor section 20. Fuel is injected into the combustion chamber 46 and mixed with the compressed core air to provide a fuel-air mixture. This fuel air mixture is ignited and combustion products thereof flow through and sequentially cause the turbine rotors 33 and 34 to rotate. The rotation of the turbine rotors 33 and 34 respectively drive rotation of the compressor rotors 32 and 31 and, thus, compression of the air received from a core airflow inlet. The rotation of the turbine rotor 34 also drives rotation of the fan rotor 30, which propels bypass air through and out of the bypass gas path 28. The propulsion of the bypass air may account for a majority of thrust generated by the turbine engine 10, e.g., more than seventy-five percent (75%) of engine thrust. The turbine engine 10 of the present disclosure, however, is not limited to the foregoing exemplary thrust ratio.

Figure 2:
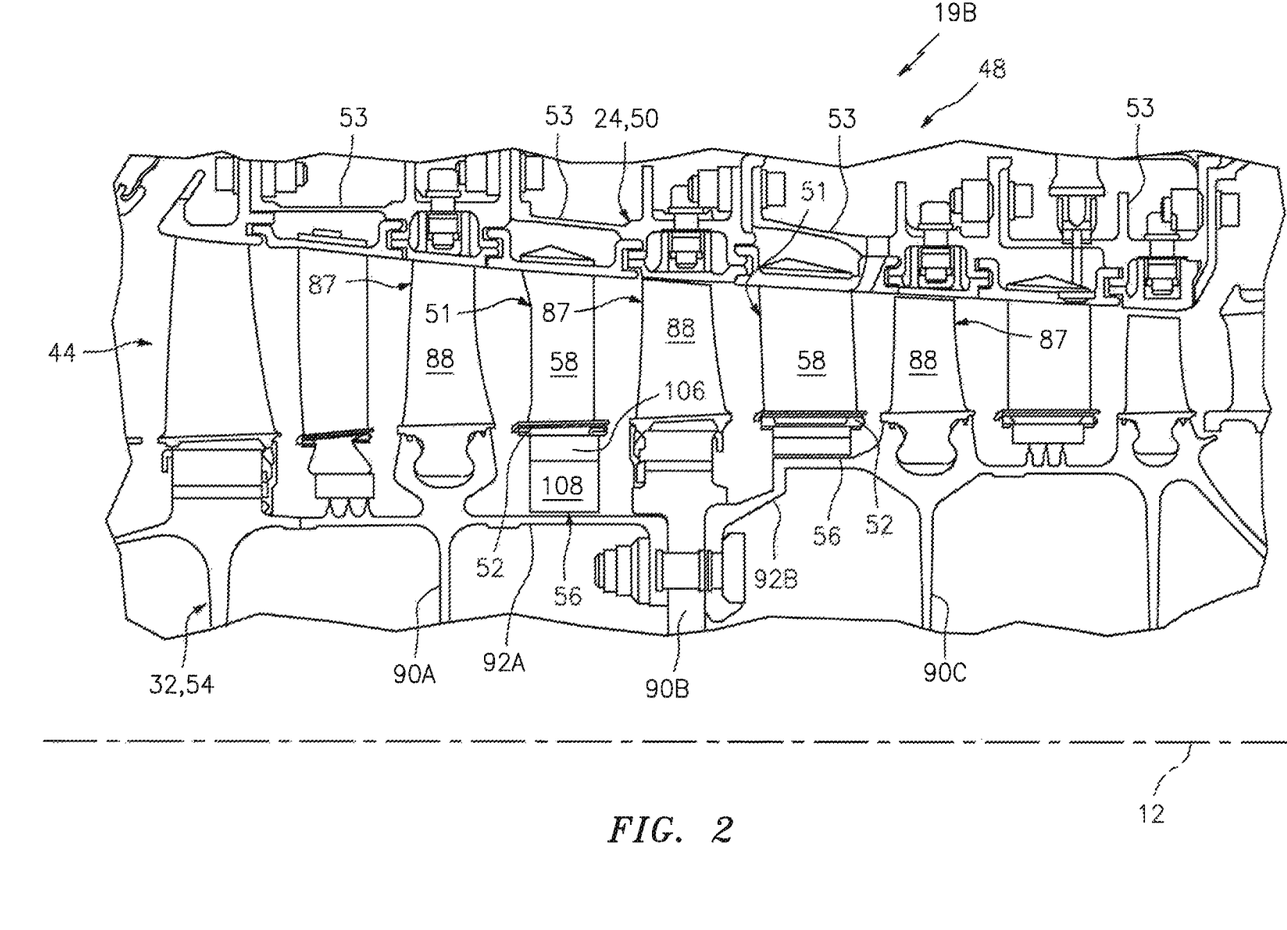
FIG. 2 is a side sectional illustration of a portion of a high pressure compressor (HPC) section.

FIG. 2 illustrates an assembly 48 for the turbine engine 10. This turbine engine assembly 48 includes an assemblage of stator elements 50-52, a rotor 54 and one or more non-contact seal assemblies 56.

The assemblage of stator elements includes a turbine engine case 50, one or more arrays 51 of stators vanes 58 and one or more stators 52. The turbine engine case 50 may be configured as part of the inner case 24. For example, the turbine engine case 50 of FIG. 2 is configured as an axial tubular sub-casing (e.g., segment) of the inner case 24, which houses at least some (or alternatively all) of the HPC rotor 32.

Figure 3:
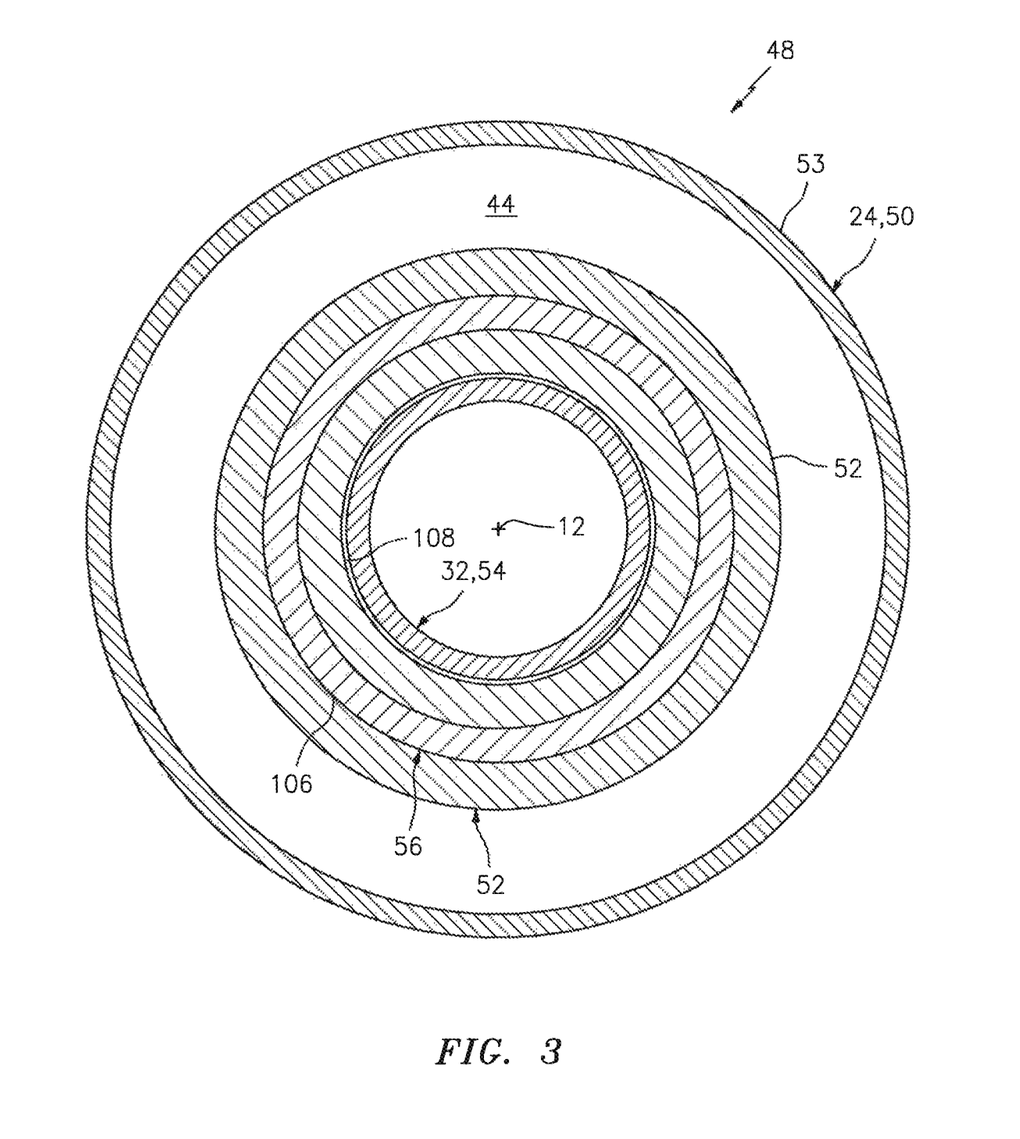
FIG. 3 is a cross-sectional block diagram of the HPC section of FIG. 2 with its stator vanes removed for ease of illustration.

Referring to FIG. 3, the turbine engine case 50 may be configured having one or more monolithic full hoop bodies 53. Herein, the term "monolithic" may describe a component which is formed as a single unitary body. The turbine engine case 50, for example, includes a plurality of integral, tubular bodies 53, where each body 53 is formed without any mechanically interconnected axial and/or circumferential segments. Note, in some embodiments, a monolithic body may include one or more bodies bonded together. For example, a metal band may be formed into a hoop and its opposing ends may be welded and/or otherwise bonded together. In another example, arcuate segments (e.g., halves) may be respectively bonded together to form a full hoop body. The assembly 48 of the present disclosure, however, is not limited to the foregoing exemplary turbine engine case configuration. For example, in other embodiments, the turbine engine case 50 may be configured with a single full hoop body or as a circumferentially segmented body.

Referring to FIG. 2, each array 51 of stator vanes 58 includes a plurality of stator vanes 58. These stator vanes 58 are arranged circumferentially around the centerline 12 and radially between the rotor 54 and the turbine engine case 50. Each of the stator vanes 58 extends radially from a respective one of the stators 52 to the turbine engine case 50.

Each of the stator vanes 58 of FIG. 2 is configured as a fixed stator vane. Herein, the term "fixed stator vane" may describe a stator vane which is fixedly attached to its respective stator and/or the turbine engine case 50. The present disclosure, however, is not limited to any particular type or configuration of stator vanes 58. For example, in alternative embodiments, one or more or all of the stator vanes 58 in one or more of the arrays 51 may each be configured as a variable stator vane. Herein, the term "variable stator vane" may describe a stator vane which may pivot about an axis, which extends generally radially out from a centerline of an engine.

Each of the stators 52 is or includes a fairing configured to form an axial portion of an inner peripheral boundary of the core gas path 44. The stator 52 (e.g., fairing) of FIG. 3 is configured having a monolithic full hoop body. This stator 52, for example, is formed as an integral, tubular body without any mechanically interconnected axial and/or circumferential segments. The assembly 48 of the present disclosure, however, is not limited to the foregoing exemplary stator configuration. For example, in other embodiments, the stator 52 may be configured as an axially and/or circumferentially segmented body.

Referring to FIG. 2, the rotor 54 may be configured as or included in one of the rotors 30-34 (see FIG. 1); e.g., the HPC rotor 32. This rotor 54 includes one or more arrays 87 of rotor blades 88, one or more rotor disks 90 (e.g., 90A, 90B, 90C) and one or more annular rotor disk linkages 92 (e.g., 92A, 92B). Each array 97 of rotor blades 88 includes a plurality of rotor blades, which are arranged circumferentially around and connected to the respective rotor disk 90. Each array of rotor blades 88 is positioned axially between neighboring arrays 51 of stator vanes 58.

Each of the linkages 92 is configured to connect respective neighboring rotor disks 90 to one another. The linkage 92A of FIG. 4, for example, extends axially between and is connected to a respective adjacent pair of the rotor disks 90A and 90B. Of course, in other embodiments, one or more of the linkages 92 may connect the rotor disk 90 to another component of the turbine engine 10 such as, for example, the high speed shaft.

Figure 4:
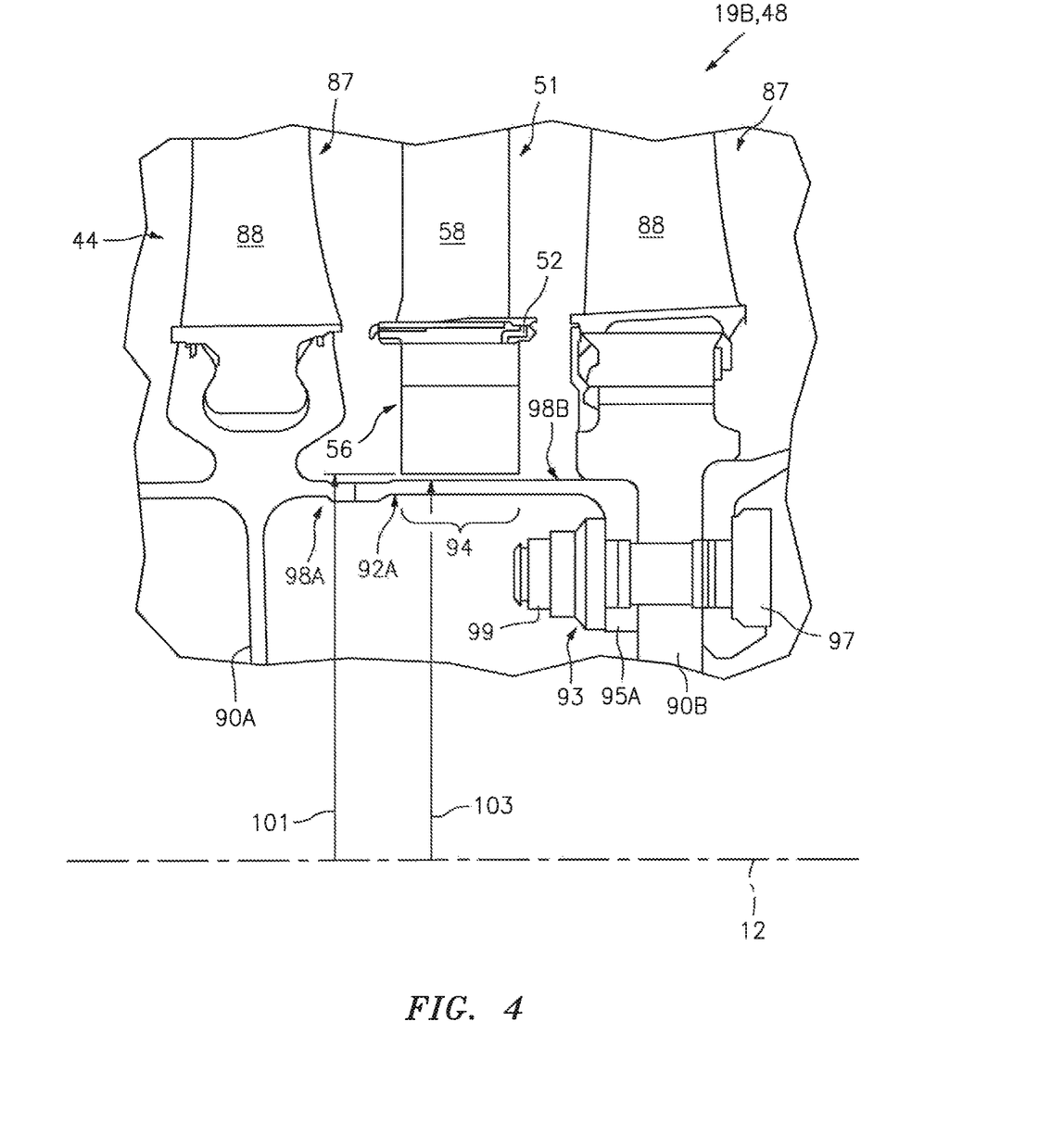
FIG. 4 illustrates an enlarged portion of FIG. 2.

Referring still to FIG. 4, the linkage 92A may be formed integral with or bonded (e.g., welded, etc.) to the first rotor disk 90A at a first end of the linkage 92A. The linkage 92 may be removably attached to the second rotor disk 90B at a second end of the linkage 92A. The linkage 92A of FIG. 4, for example, is attached to the second rotor disk 90B with one or more fasteners 93. More particularly, the linkage 92A of FIG. 4 includes a flange connector 95A, which is mechanically fastened to the rotor disk 90A with a plurality of bolts 97 and nuts 99. The linkage 92 of the present disclosure, however, may also or alternatively be attached to the second rotor disk 90B using one or more connections other than the exemplary bolted connection described above. Furthermore, while the first end of the linkage 92 is shown in FIG. 4 as being upstream of the second end, these ends and their respective connections may be reversed as generally shown, for example, in FIG. 5.

Figure 5:
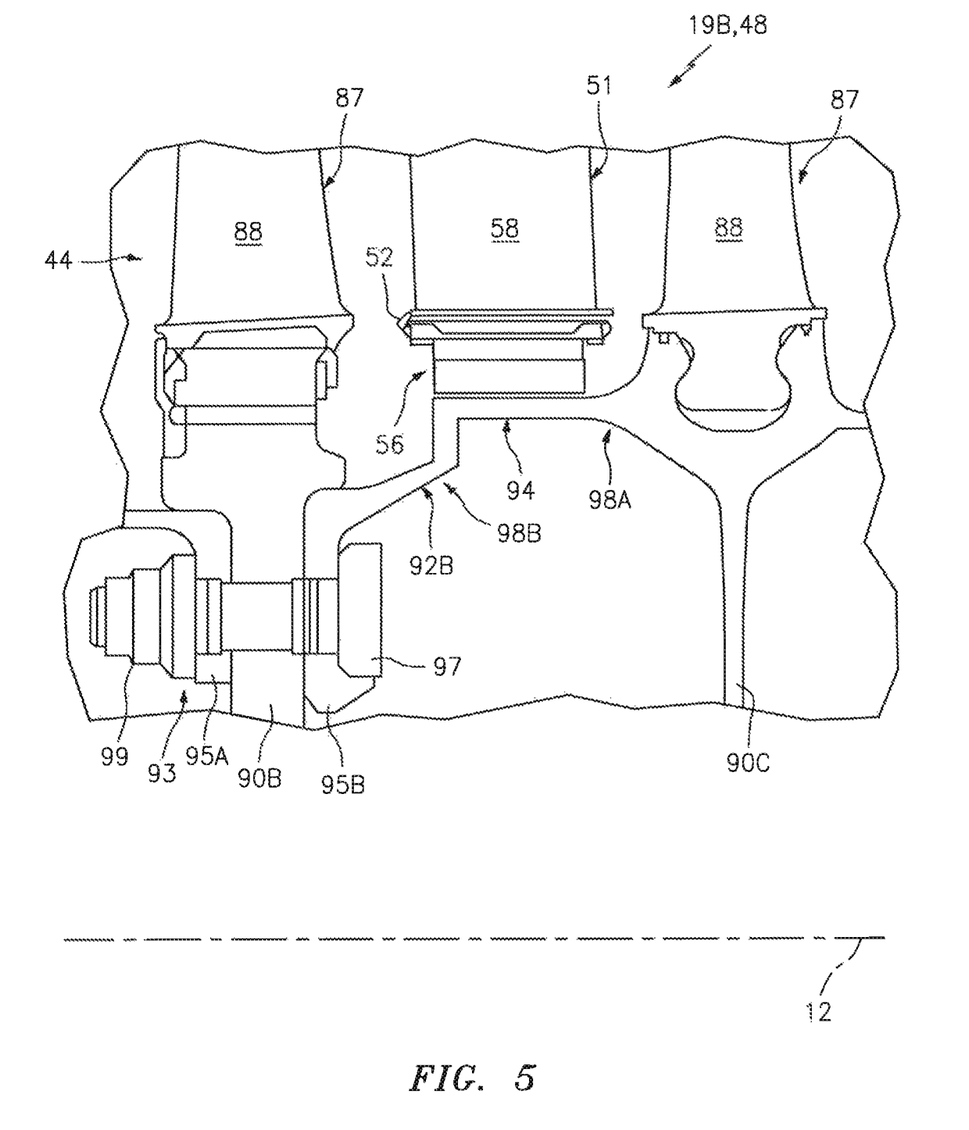
FIG. 5 illustrates another enlarged portion of FIG. 2.

One or more parts 94, 95A, 98A and 98B of the linkage 92 (or the whole of the linkage 92A as shown in FIG. 4) has an outermost radius 101 which is sized less than an innermost radius 103 of the non-contact seal assembly 56 (e.g., the non-contact seal). In this manner, those parts 94, 95 and 98B of the linkage 92 may be inserted into and passed axially through the seal assembly 56 during assembly of the rotor 54. In the exemplary embodiment shown in FIG. 4, the parts of the linkage 92A includes an intermediate seal portion 94 and adjacent end portions 98A and 98B of the linkage 92A as well as the flange connector 95A. Of course, in other embodiments as shown in FIG. 5, at least one of the parts of the linkage 92 (e.g., the end portion 98A) which need not be passed through the seal assembly 56 during assembly may have an outermost radius which is greater than the innermost radius 103.

Figure 6:
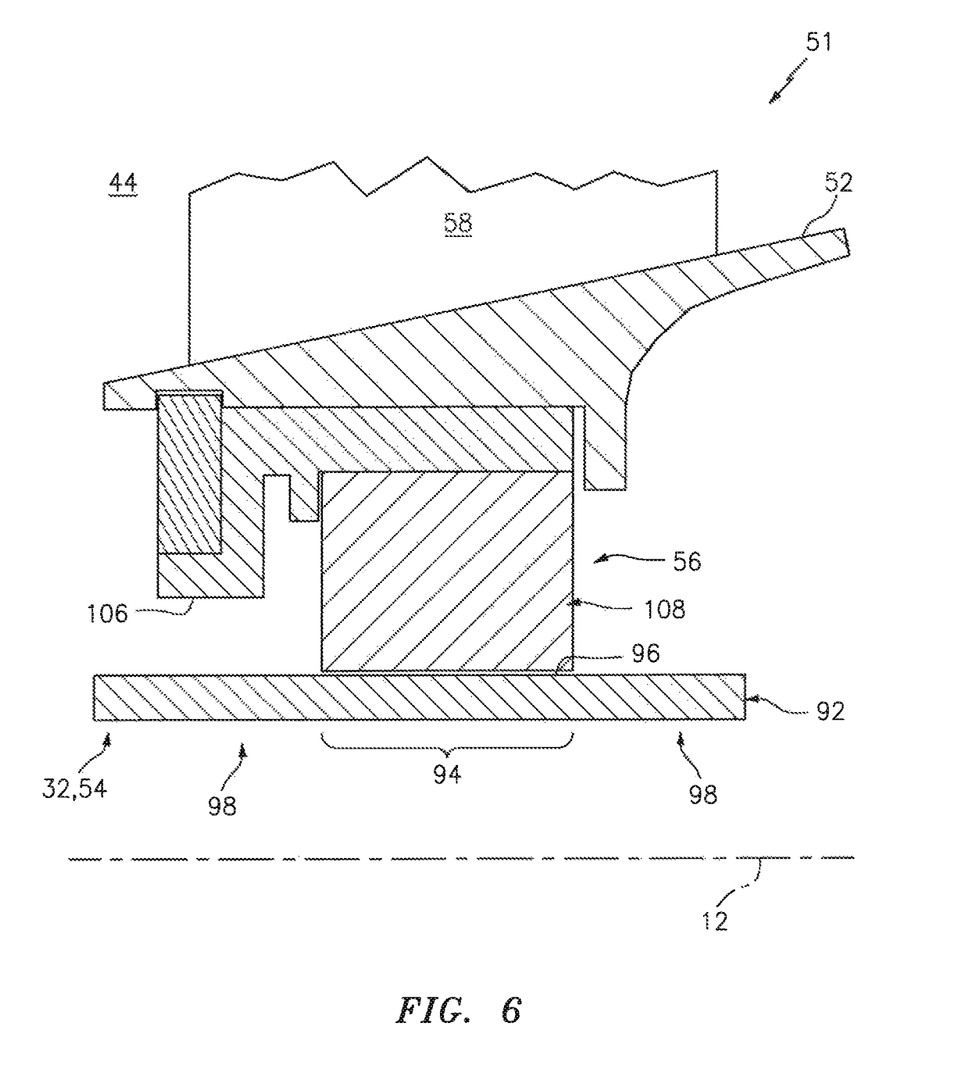
FIG. 6 is a side-sectional block diagram of a portion of the HPC section of FIG. 2.

Referring now to FIG. 6, the seal portion 94 may have an outer cylindrical surface 96. Herein, the term "cylindrical" may describe a surface or part with a circular-annular cross-sectional geometry which extends substantially (e.g., only) axially along a centerline. In contrast, a "conical" surface or part may also extend in a radial direction towards or away from the centerline. Referring still to FIG. 6, this seal portion 94 may have substantially the same radial thickness as one or more other portions of the linkage 92; e.g., the portions.

Figure 7:
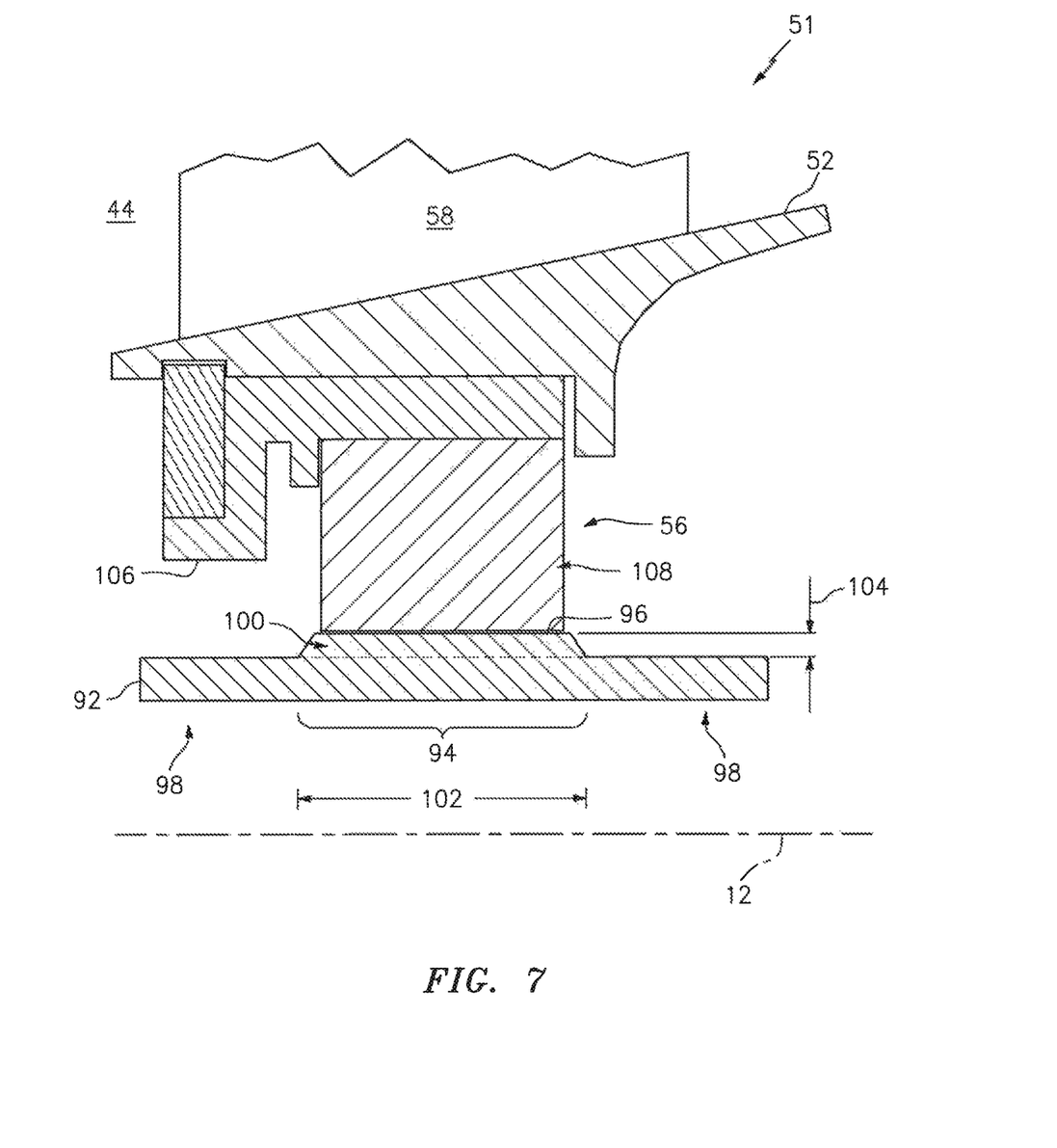
FIG. 7 is a side-sectional block diagram of a portion of an alternative HPC section.

Referring to FIG. 7, the seal portion 94 may alternatively be radially thicker than one or more adjacent portions 98A and 98B of the linkage 92. This additional thickness (e.g., seal region 100) may be provided by, for example, building up linkage material on or by forming a hardface on a base portion of the linkage 92, where the material buildup or the hardface form the cylindrical surface 96. In another example, the hardface may by formed on the buildup of material, wherein the hardface material has a hardness value different than and harder than the base linkage material. This hardface material may be the same material as the base linkage material where, for example, that portion of the material is (e.g., heat) treated to increase its hardness. Alternatively, the hardface material may be different than the base linkage material beneath.

The seal portion 94 of FIG. 7 has an axial length 102 that is greater than its radial thickness 104. In general, the axial length 102 is greater than an axial length of the non-contact seal assembly 56. With the foregoing configuration of FIG. 7, the linkage 92 may accommodate infrequent periodic contact with a respective one of the non-contact seal assemblies 56, where such contact may wear away the material of the linkage 92. This additional thickness may reduce internal stress concentrations within the linkage material caused by wear from periodic contact with the assembly 56. Furthermore, the additional thickness of the seal region 100 may be restored during a rebuild process by filling in wear grooves with additional material and/or removing some or all of the worn seal region 100 and forming a new seal region 100 in its place without compromising the linkage base portion beneath. This in turn may prolong the useful life of the linkage 92. The hardface may also provide a barrier to prevent incidental wear from progressing into a crack in the linkage 92.

Referring to FIGS. 3 and 6, each of the seal assemblies 56 is arranged in a radial gap between a respective one of the stators 52 and a respective one of the linkages 92. Each of the seal assemblies 56 is configured to substantially seal the respective gap. The seal assembly 56 of FIGS. 3 and 6, for example, includes an annular carrier 106 and an annular non-contact seal 108 such as, but not limited to, a hydrostatic non-contact seal.

The carrier 106 is configured to mount the non-contact seal 108 to the respective stator 52. The carrier 106 may be configured having a monolithic full hoop body. The carrier 106, for example, is formed as an integral, tubular body without any mechanically interconnected axial and/or circumferential segments. The assembly 48 of the present disclosure, however, is not limited to the foregoing exemplary carrier configuration. For example, in other embodiments, the carrier 106 may be configured as an axially and/or circumferentially segmented body.

Referring to FIGS. 8 to 11, the non-contact seal 108 includes one or more circumferentially spaced shoes 126 which are located in a non-contact position along the cylindrical surface 96 of the respective linkage 92. Each shoe 126 is formed with a sealing surface 128 and a slot 130 extending radially inwardly toward the sealing surface 128.

Figure 8:
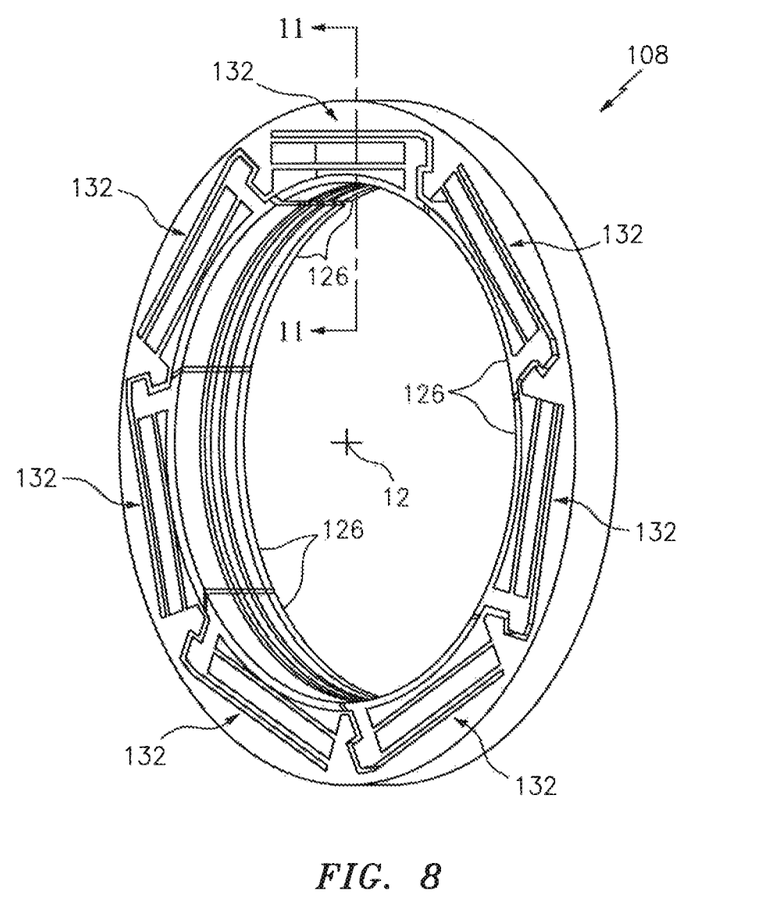
FIG. 8 is a perspective illustration of a non-contact seal.
Figure 9:
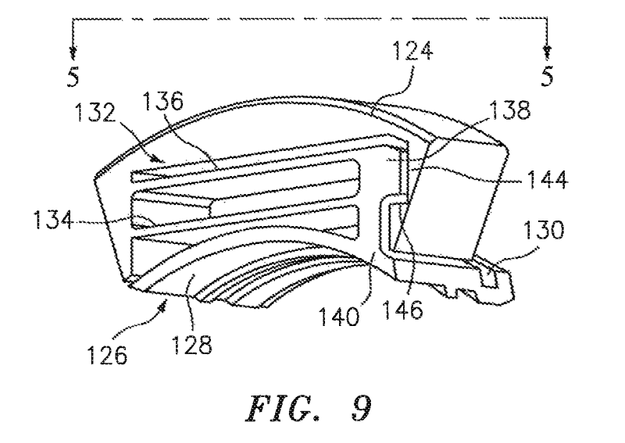
FIG. 9 is a perspective illustration of a portion of the non-contact seal of FIG. 8.
Figure 10:
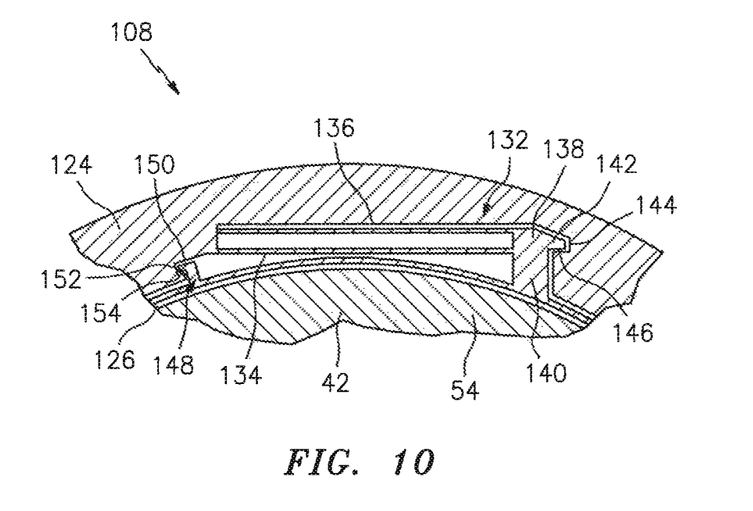
FIG. 10 is a cross-sectional illustration of a portion of the non-contact seal of FIG. 8.
Figure 11:
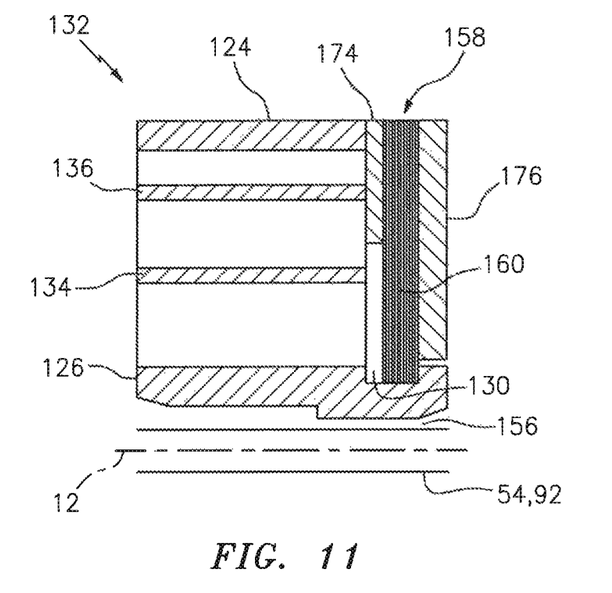
FIGS. 11 and 12 are side sectional illustrations of alternative portions of the non-contact seal of FIG. 8.

Under some operating conditions, particularly at higher pressures, it may be desirable to limit the extent of radial movement of the shoes 126 with respect to the rotor 54 to maintain tolerances; e.g., the spacing between the shoes 126 and the cylindrical surface 96. The non-contact seal 108 includes one or more circumferentially spaced spring elements 132, the details of one of which are best seen in FIGS. 10 and 11. Each spring element 132 is formed with an inner band 134 and an outer band 136 radially outwardly spaced from the inner band 134. One end of each of the bands 134 and 136 is mounted to or integrally formed with a stationary base 124 of the seal and the opposite end thereof is connected to a first stop 138. This base 124 may be configured as a monolithic full hoop body as best seen in FIG. 8. Of course, the present disclosure is not limited to the aforesaid exemplary configuration.

Figure 12:
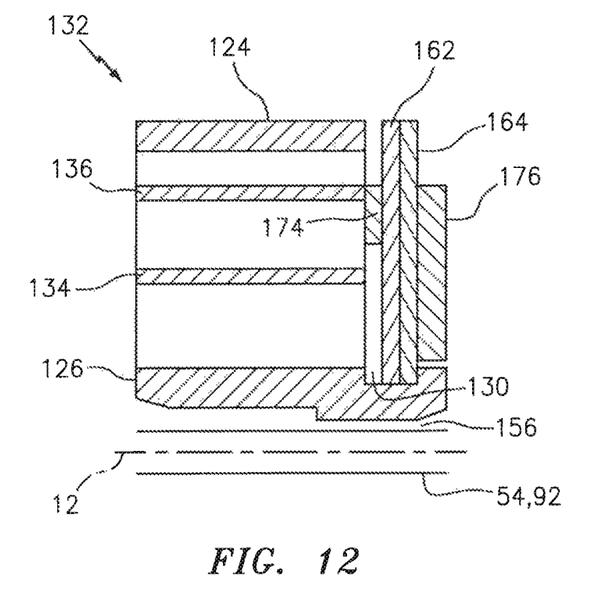

The first stop 138 includes a strip 140 which is connected to a shoe 126 (one of which is shown in FIGS. 11 and 12), and has an arm 142 opposite the shoe 126 which may be received within a recess 144 formed in the base 124. The recess 144 has a shoulder 146 positioned in alignment with the arm 142 of the first stop 138.

A second stop 148 is connected to or integrally formed with the strip 140 and is connected to the shoe 126. The second stop 148 is circumferentially spaced from the first stop 138 in a position near the point at which the inner and outer bands 134 and 136 connect to the base 124. The second stop 148 is formed with an arm 150 which may be received within a recess 152 in the base 124. The recess 152 has a shoulder 154 positioned in alignment with the arm 150 of second stop 148.

During operation, aerodynamic forces may be developed which apply a fluid pressure to the shoe 126 causing it to move radially with respect to the respective linkage 92. The fluid velocity increases as the gap 156 between the shoe 126 and respective linkage 92 increases, thus reducing pressure in the gap 156 and drawing the shoe 126 radially inwardly toward the rotor 54. As the seal gap 156 closes, the velocity decreases and the pressure increases within the seal gap 156 thus forcing the shoe 126 radially outwardly from the rotor 54. The spring elements 132 deflect and move with the shoe 126 to create a primary seal of the circumferential gap 156 between the rotor 54 and base 124 within predetermined design tolerances. The first and second stops 138 and 148 may limit the extent of radially inward and outward movement of the shoe 126 with respect to the rotor 54 for safety and operational limitation. A gap is provided between the arm 142 of first stop 138 and the shoulder 146, and between the arm 150 of second stop 148 and shoulder 154, such that the shoe 126 can move radially inwardly relative to the rotor 54. Such inward motion is limited by engagement of the arms 142, 150 with shoulders 146 and 154, respectively, to prevent the shoe 126 from contacting the rotor 54 or exceeding design tolerances for the gap between the two. The arms 142 and 150 also contact the base 124 in the event the shoe 126 moves radially outwardly relative to the rotor 54, to limit movement of the shoe 126 in that direction.

Figure 13:
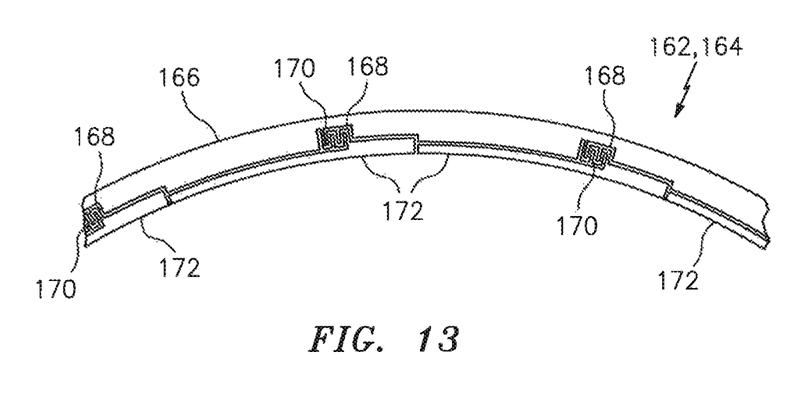
FIG. 13 is an end view illustration of a portion of a plate.

The non-contact seal 108 is also provided with a secondary seal which may take the form of a brush seal 158, as shown in FIG. 11, or a stack of at least two sealing elements oriented side-by-side and formed of thin sheets of metal or other suitable material as shown in FIGS. 12 and 13. The brush seal 158 is positioned so that one end of its bristles 160 extends into the slot 130 formed in the shoe 126. The bristles 160 deflect with the radial inward and outward movement of the shoe 126, in response to the application of fluid pressure as noted above, in such a way as to create a secondary seal of the gap 156 between the rotor 54 and base 124.

Figure 14:
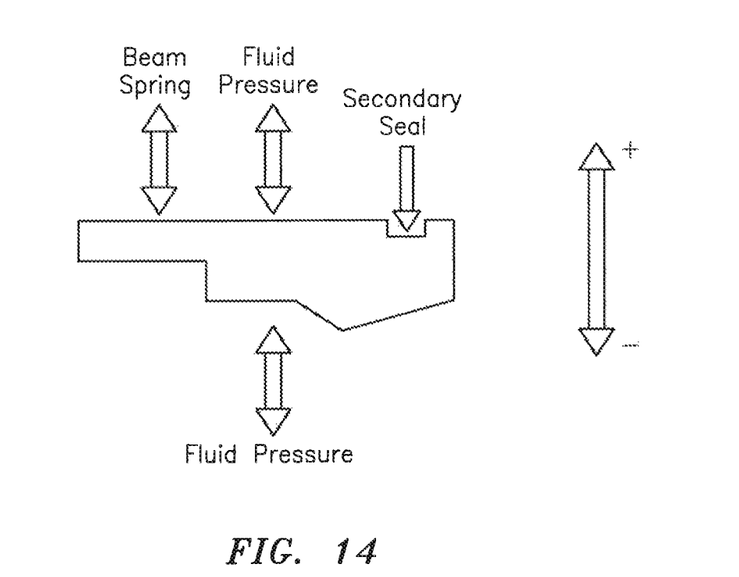
FIG. 14 is a force balance diagram of a shoe depicting aerodynamic forces, spring forces and secondary seal forces acting on the shoe.

Referring now to FIGS. 12 and 13, the secondary seal of this embodiment may include a stack of at least two sealing elements 162 and 164. Each of the sealing elements 162 and 164 includes an outer ring 166 formed with a plurality of circumferentially spaced openings 168, a spring member 170 mounted within each opening 168 and a plurality of inner ring segments 172 each connected to at least one of the spring members 170. The spring member 170 is depicted in FIG. 14 as a series of connected loops, but it should be understood that spring member 170 could take essentially any other form, including parallel bands as in the spring elements 132. The sealing elements 162 and 164 are oriented side-by-side and positioned so that the inner ring segments 172 extend into the slot 130 formed in the shoe 126. The spring members 170 deflect with the radial inward and outward movement of the shoe 126, in response to the application of fluid pressure as noted above, in such a way as to create a secondary seal of the gap 156 between the rotor 54 and base 124. As such, the sealing elements 172 and 164 assist the spring elements 132 in maintaining the shoe 126 within design clearances relative to the rotor 54.

One or more of the spring elements 162 and 164 may be formed of sheet metal or other suitable flexible, heat-resistant material. The sealing elements 162 and 164 may be attached to one another, such as by welding and/or any other bonding technique, a mechanical connection or the like, or they may positioned side-by-side within the slot 130 with no connection between them. In order to prevent fluid from passing through the openings 168 in the outer ring 166 of each sealing element 162 and 164, adjacent sealing elements are arranged so that the outer ring 166 of one sealing element 162 covers the openings 168 in the adjacent sealing element 164. Although not required, a front plate 174 may be positioned between the spring element 132 and the sealing element 162, and a back plate 176 may be located adjacent to the sealing element 164 for the purpose of assisting in supporting the sealing elements 162, 164 in position within the shoe 126.

During operation, the non-contact seal 108 is subjected to aerodynamic forces as a result of the passage of air along the surface of the shoes 126 and the respective linkage 92 and, more particularly, the respective seal portion 94. The operation of non-contact seal 108 is dependent, in part, on the effect of these aerodynamic forces tending to lift the shoes 126 radially outwardly relative to the surface of rotor 54, and the counteracting forces imposed by the spring elements 132 and the secondary seals (e.g., brush seal 158 or the stacked seal formed by plates 162, 164) which tend to urge the shoes 126 in a direction toward the rotor 54. These forces acting on the shoe 126 are schematically depicted with arrows in FIG. 14. These forces acting on the non-contact seal 108 may be balanced to ensure that nominal clearance is maintained.

Figure 15:
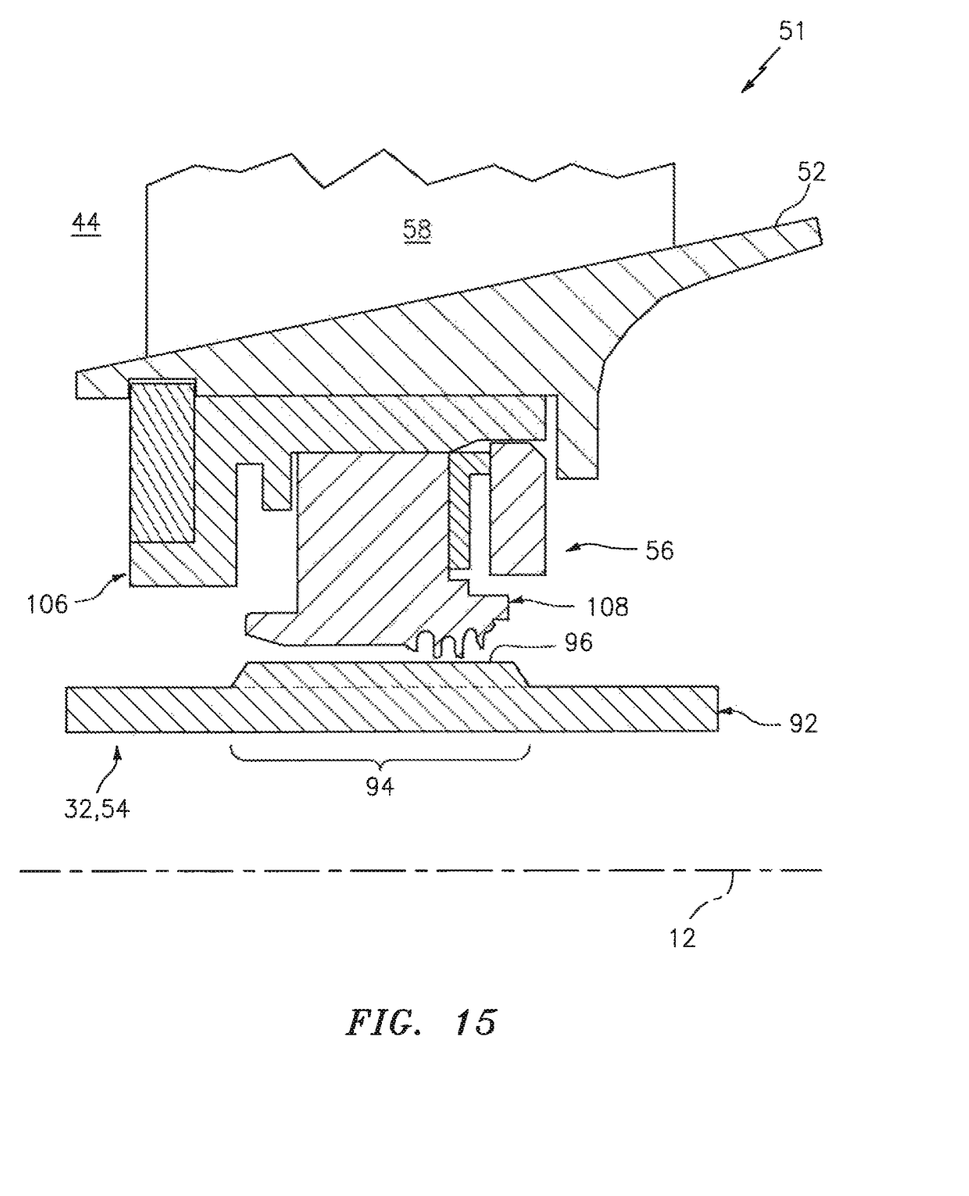
FIG. 15 is a side-sectional illustration of a portion of an alternative HPC section.

The present disclosure is not limited to the exemplary non-contact seal 108 described above. Various other non-contact seals are known in the art and may be reconfigured in light of the disclosure above to be included with the assembly 48 of the present disclosure. An example of such an alternative non-contact seal 108 is illustrated in FIG. 15. Other examples of non-contact seals are disclosed in U.S. Pat. Nos. 8,172,232; 8,002,285; 7,896,352; 7,410,173; 7,182,345; and 6,428,009, each of which is hereby incorporated herein by reference in its entirety. Still another example of a non-contact seal is a hydrodynamic non-contact seal.

The assembly 48 may be included in various aircraft and industrial turbine engines other than the one described above as well as in other types of rotational equipment; e.g., wind turbines, water turbines, rotary engines, etc. The assembly 48, for example, may be included in a geared turbine engine where a gear train connects one or more shafts to one or more rotors in a fan section, a compressor section and/or any other engine section. Alternatively, the assembly 48 may be included in a turbine engine configured without a gear train. The assembly 48 may be included in a geared or non-geared turbine engine configured with a single spool, with two spools (e.g., see FIG. 1), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for rotational equipment, the assembly comprising:
   a stator;
   a rotor extending axially along a centerline, the rotor including a linkage, a first rotor disk, and a second rotor disk, wherein the linkage extends axially from the first rotor disk to the second rotor disk, and wherein the linkage is removably attached to the second rotor disk; and
   a seal assembly configured for sealing a gap radially between the stator and the linkage, wherein the seal assembly includes a hydrostatic non-contact seal that comprises:
   an annular base;
   a plurality of shoes arranged around and radially adjacent the linkage; and
   a plurality of spring elements, each of the spring elements radially between and connecting a respective one of the shoes to the base, and each of the spring elements discrete and physically separated from circumferentially adjacent ones of the spring elements;
   wherein the non-contact seal is positioned directly radially above and is axially aligned with a cylindrical surface of a seal portion of the linkage; and
   wherein the seal portion of the linkage has a hardface which forms the cylindrical surface.

2. The assembly of claim 1, wherein the base is configured with a monolithic full hoop body.

3. The assembly of claim 1, further comprising a carrier connecting the non-contact seal to the stator, wherein the carrier is configured with a monolithic full hoop body.

4. The assembly of claim 1, wherein the seal portion of the linkage is radially thicker than adjacent portions of the linkage.

5. The assembly of claim 1, wherein the seal portion of the linkage is radially thicker by an additional thickness than adjacent portions of the linkage, and wherein the hardface provides a portion of the additional thickness.

6. The assembly of claim 1, wherein the stator is configured with a monolithic full hoop body.

7. The assembly of claim 1, wherein the stator comprises a fairing configured to form an axial portion of an inner peripheral boundary of a core gas path through the rotational equipment, and the rotational equipment is configured as a gas turbine engine.

8. The assembly of claim 1, further comprising:
   a plurality of first rotor blades arranged around and connected to the first rotor disk;
   a plurality of second rotor blades arranged around and connected to the second rotor disk; and
   a plurality of stator vanes arranged around and connected to the stator, wherein the stator vanes are axially between the first rotor blades and the second rotor blades.

9. The assembly of claim 1, wherein the linkage includes a flange connector attached to the second rotor disk with one or more fasteners, the flange connector has an outermost radius, and the non-contact seal has an innermost radius that is greater than the outermost radius.

10. The assembly of claim 1, wherein the linkage has an outermost radius and the non-contact seal has an innermost radius that is greater than the outermost radius.

11. The assembly of claim 1, wherein a portion of the linkage is configured to pass through the non-contact seal during assembly.

12. An assembly for a gas turbine engine, the assembly comprising:
   a first rotor disk;
   a second rotor disk;
   an annular linkage extending axially from the first rotor disk to the second rotor disk, wherein the linkage is mechanically fastened to the second rotor disk, and wherein the linkage has a cylindrical surface;
   an annular fairing axially between the first rotor disk and the second rotor disk; and a non-contact seal configured in a gap formed between the fairing and the linkage, the non-contact seal including a base, a plurality of shoes and a plurality of spring elements, wherein the base is mounted to the fairing, wherein the shoes are circumferentially arranged around and radially adjacent the cylindrical surface, wherein each of the spring elements are radially between and connect a respective one of the shoes to the base, and wherein each of the spring elements comprises a cantilevered beam;

wherein the seal portion of the linkage has a hardface which forms the cylindrical surface.

13. The assembly of claim 12, wherein the linkage is configured to partially pass axially through the non-contact seal during assembly.

14. The assembly of claim 12, further comprising a carrier which mounts the base to the fairing, wherein the carrier is configured with a monolithic full hoop body.

15. The assembly of claim 12, wherein the fairing is configured with a monolithic full hoop body, and wherein the base is configured with a monolithic full hoop body.

16. The assembly of claim 12, wherein a portion of the linkage which forms the cylindrical surface is radially thicker than axially adjacent portions of the linkage.

17. An assembly for rotational equipment, the assembly comprising:

a stator;

a rotor extending axially along a centerline, the rotor including a linkage, a first rotor disk, and a second rotor disk, wherein the linkage extends axially from the first rotor disk to the second rotor disk, and wherein the linkage is removably attached to the second rotor disk; and a seal assembly configured for sealing a gap radially between the stator and the linkage, wherein the seal assembly includes a hydrostatic non-contact seal;

wherein the non-contact seal is positioned directly radially above and is axially aligned with a cylindrical surface of a seal portion of the linkage; and wherein the seal portion of the linkage has a hardface which forms the cylindrical surface.

\* \* \* \* \*